United States Patent Office 2,968,636
Patented Jan. 17, 1961

2,968,636
METHOD OF PRODUCING AN IRON OXIDE-CHROMIUM OXIDE COMPLEX

Clement Sciallano and Roger Carles, Marseille, France, assignors to Société des Couleurs de Provence, La Barasse, par Saint-Marcel, France, a corporation of France No Drawing. Filed Nov. 19, 1957, Ser. No. 697,323

Claims priority, application France Dec. 5, 1956

10 Claims. (Cl. 252—470)

It is well known to mix iron oxide and chromium oxide in varying proportions to prepare catalysts for use in chemical reactions, for example: the production of hydrogen from carbon oxide in the presence of steam, or the synthesis of some hydrocarbons.

Such catalysts require an intimate mixing of the iron oxide and chromium oxide to form an effective catalyst. Numerous methods have been devised to obtain this intimate mixing of the oxides:

Co-precipitation from a mixture of the iron and chromium salts by using an alkaline substance;

Mixing the hydrates and nitrates of iron and chromium and calcining the mixture;

Impregnating a synthetic iron oxide with chromium nitrate or chromic anhydride which may or may not be calcined;

An extensive crushing of both oxides to form an intimate mixture.

The mixtures obtained by the above methods may be used directly as catalysts; however, normally they are formed into billets, tablets or lumps, which permit the gases to pass through the apparatus more readily.

The present invention is directed to a method of preparing an intimate iron oxide-chromium oxide complex for use as a catalyst in chemical reactions. The process consists in forming a suspension of monohydrous ferric oxide in a ferrous salt solution; heating the solution to a temperature between 55° and 65° C.; introducing metallic iron into the solution; bubbling air through the solution for a short period of time and then adding hydrous chromic sulphate; and continuing the bubbling of air through the solution until the chromium deposits on the monohydrate ferric oxide in the form of $Cr_2O_3$. The monohydrous ferric oxide and the chromium oxide are filtered from the solution and dried.

During the introduction of the air, the chromium is progressively deposited on the monohydrous ferric oxide while the content of chromium salt in the solution becomes less and less. At the same time, there is a slight increase in the amount of the iron oxide in the solution, with a similar loss in weight in the metallic iron.

It is very important in practicing the present invention to perform the chromium precipitation in an acidic bath, for example, with a pH between about 3 and 4. Only in this pH range are the products produced which are most desirable for use as catalysts.

The mixture of iron oxide and chromium oxide obtained in the present invention forms a base material for catalysts and the like. This oxide mixture may be used directly or may be first dehydrated, reduced, oxidized, agglomerated, or otherwise processed to place it in a desirable form for use as catalysts. It has been found that more than a mere mixture of the iron oxide and chromium oxide results as a product of the present invention. An X-ray examination has revealed rays of monohydrous ferric oxide but yields no evidence of the chromium oxide. Since there is little chance that chromium oxide is amorphous, it is presumed that it is absorbed into the iron network. An electronic microscopic examination has shown that the product resulting from the present invention consists of iron oxide crystals which are bristled with a number of buddings which may represent a compound of iron oxide and chromium oxide.

Although the process of the present invention may be performed between 55° C. and 65° C., the most efficient temperature is between 60° C. and 65° C. If a temperature below 55° C. is used, the precipitation is extremely slow; and if a temperature above 65° C. is used, the heat is needlessly wasted.

The metallic iron may be introduced into the solution in the form of sheet waste borings or chippings to maintain the solution as a reducing medium. The pieces must be large enough to be easily removed from the solution at the end of the process.

The monohydrous ferric oxide has the formula $Fe_2O_3.H_2O$; is yellow in color; and is found in the natural state or manufactured under the name "yellow synthetic iron oxide" by Williams and Mapico in the United States.

Preferably the ferric oxide is a monohydrate crystallized in the form of needles which gives a felty texture favorable to gas penetration in its ultimate utilization as a catalyst. Best results are obtained with needles of ferric oxide between ½ and 1 micron in length.

The ferrous salt may be a sulphate, chloride or other soluble salt, and oftentimes, may be the residue from some manufacturing process. It is only important that the ferrous ion be present in the solution.

The chromium salt may be in the form of a sulphate, chloride or other soluble salt such as: chromic sulphate, chromic chloride, chromium alums, sodium chromate or potassium dichromate. The sodium chromate and potassium dichromate must be added very slowly, for example, over a period of 24 to 48 hours, to avoid too rapid an oxidation of the ferrous salt.

The oxidation by bubbling air through the solution may be replaced by the slow introduction of an oxidizing agent such as hydrogen peroxide.

Catalysts formed according to the present invention have been comparatively tested with two well-known similar catalysts on a process for the conversion of CO into $CO_2$. Our catalyst had a substantially lower density: 1.07 kg. compared to 1.35 kg. and 1.36 kg. for the other well-known catalysts. This would, of course, result in economies in the amount of catalyst necessary to fill the conversion apparatus. However, it was found that the catalyst prepared according to the present invention performed equal to or better than the known catalysts even through a much smaller quantity of the catalyst was used.

Example 1

Three liters of a ferrous sulphate solution containing 30 grams of ferrous ions per liter were placed in a deep 5 liter vessel. This ferrous sulphate solution contained approximately 81 grams of anhydrous ferrous sulphate per liter of solution. 250 grams of yellow monohydrous ferric oxide were placed in suspension in the solution by stirring and about 1500 grams of iron in the form of $\%_{10}$ mm. sheet waste were introduced into the solution. After heating to 60° C., air was blown into the solution through the vessel bottom at the rate of about 100 liters per hour. Then 120 grams of hydrous chromic sulphate dissolved in about 500 cc. hot water were added. After 48 hours of continuously bubbling air through the solution, the temperature being held constantly at about 60° C., it was observed that the chromium had been substantially entirely precipitated on the ferric oxide. The suspension was then filtered and the residue carefully washed on a filter and dried. The residue was found to contain 7% chromium in the form of $Cr_2O_3$.

Example 2

In a factory manufacturing yellow monohydrous synthetic ferric oxide, at a particular step in the process of manufacturing the ferric oxide, a 10 cubic meter vessel, containing a mass of about 800 kg. of iron waste and a suspension of ferric oxide monohydrate of about 80 grams per liter in a solution of ferrous sulphate containing 33 grams of ferrous ions per liter, was heated to about 60° C. 150 kg. of monohydrous chromic sulphate were added to the solution and air was blown in through the bottom of the vessel while the temperature was maintained at about 60° C. After 48 hours of air blowing, it was observed that the chromium had precipitated substantially completely on the iron oxide. The suspension contained 120 grams per liter of a solid formed by the mixture of iron and chromium hydroxides. The percentage of chromium in this solid in the form of $Cr_2O_3$ was 7.5%.

While we have described a present preferred embodiment of our invention, it may be otherwise embodied within the scope of the following claims.

We claim:

1. A method of preparing complex iron-chromium mixtures consisting essentially of suspending monohydrous ferric oxide in an aqueous ferrous salt solution, adding metallic iron and a soluble chromium salt to the solution, maintaining the pH of the solution between about 3–4 and the temperature of the solution between about 55–65° C., and oxidizing the solution to deposit the chromium on the monohydrous ferric oxide.

2. A method as recited in claim 1 wherein the solution is oxidized by bubbling air through it.

3. A method as recited in claim 1 wherein air is bubbled through the solution after the addition of the metallic iron but prior to the addition of the chromium salt, and the solution is oxidized by bubbling air through it.

4. A method as recited in claim 1 wherein the ferrous salt is selected from the group consisting of sulphates and chlorides.

5. A method as recited in claim 1 wherein the chromium salt is selected from the group consisting of chromic sulphate, chromic chloride, chromium alum, sodium chromate and potassium dichromate.

6. A method of preparing intimate mixtures of iron oxide and chromium oxide comprising oxidizing an aqueous ferrous salt solution containing suspended monohydrous ferric oxide, metallic iron and a soluble chromium salt, the chromium being deposited on the ferric oxide during the oxidation, the pH of the solution being maintained between about 3–4 and the temperature of the solution being maintained between about 55–65° C. during the deposition of the chromium.

7. A method as recited in claim 6 wherein the solution is oxidized by bubbling air through it.

8. A method as recited in claim 6 wherein the ferrous salt is selected from the group consisting of sulphates and chlorides.

9. A method as recited in claim 6 wherein the chromium salt is selected from the group consisting of chromic sulphate, chromic chloride, chromium alum, sodium chromate and potassium dichromate.

10. A method of preparing an intimate iron oxide-chromium oxide complex adapted for use as a catalyst in chemical reactions, consisting essentially of suspending monohydrous ferric oxide in an aqueous solution containing a ferrous salt from the group consisting of sulphates and chlorides; adding metallic iron to the solution sufficient to maintain the solution as a reducing medium; adding a soluble chromium salt to the solution, said chromium salt being selected from the group consisting of chromic sulphate, chromic chloride, chromium alum, sodium chromate and potassium dichromate; maintaining the pH of the solution between about 3–4 and maintaining the temperature of the solution between about 55°–65° C. while bubbling air through the solution to oxidize the solution and deposit the chromium on the ferric oxide.

References Cited in the file of this patent

UNITED STATES PATENTS

| | | |
|---|---|---|
| 1,330,772 | Bosch et al. | Feb. 10, 1920 |
| 1,908,484 | Larson | May 9, 1933 |
| 2,631,086 | Moak et al. | Mar. 10, 1953 |